(12) United States Patent
Russell et al.

(10) Patent No.: US 7,881,456 B1
(45) Date of Patent: Feb. 1, 2011

(54) MUSIC PHONE, STATION, AND SYSTEM AND METHOD OF USING SAME

(75) Inventors: Eva Russell, Poway, CA (US); Frank Tyneski, Solana Beach, CA (US); Russell Paik, Poway, CA (US); Leung Philip, Cambridge, MA (US); Hosler Travis, Somerville, MA (US); Gant Evan, Medford, MA (US)

(73) Assignee: Kyocera Corporation, Kyoto (JP)

( * ) Notice: Subject to any disclaimer, the term of this patent is extended or adjusted under 35 U.S.C. 154(b) by 1070 days.

(21) Appl. No.: 11/531,649

(22) Filed: Sep. 13, 2006

(51) Int. Cl.
*H04M 1/00* (2006.01)

(52) U.S. Cl. .................. 379/374.01; 379/391; 379/442; 455/426.1

(58) Field of Classification Search ............ 379/374.01, 379/430, 391; 455/569, 568; 381/12, 307, 381/311
See application file for complete search history.

(56) References Cited

U.S. PATENT DOCUMENTS

| | | | | |
|---|---|---|---|---|
| 6,078,825 | A * | 6/2000 | Hahn et al. ............... | 455/569.2 |
| 2002/0119800 | A1 | 8/2002 | Jaggers et al. | |
| 2004/0071285 | A1* | 4/2004 | Satoh et al. .................. | 379/419 |
| 2004/0224638 | A1 | 11/2004 | Fadell et al. | |
| 2004/0235518 | A1* | 11/2004 | Beyette et al. ............ | 455/554.2 |
| 2005/0020257 | A1* | 1/2005 | Davis ....................... | 455/426.1 |
| 2005/0031117 | A1* | 2/2005 | Browning et al. ........... | 379/391 |

OTHER PUBLICATIONS

[online] [Retrieved on Jan. 12, 2010—8:13 AM] [http://www.lge.com/us/press-release/article/verizon-wireless-and -lg-mobile-phones-unveil-the lg-vx8300.jsp] [pp. 1-10].*
[online] [Retrieved on Jan. 13, 2010—9:15 AM] [ http://www.lge.com/us/mobile-phones/pdf/VX8300_Datasheet/pdf] [pp. 1 & 2].*
[online] [Retrieved on Jan. 12, 2010—10:15 AM] [http://www.harmankardon.com/resources/Brands/harmankardon/Products/ProductRelatedDocuments/en-US/OwnerManual/Soundsticks%20om.pdf] [pp. 1-8].*
[online] [Retrived on Feb. 24, 2010] [http://worldwide.bose.com/axa/en_nz/webmultimedia_speaker_manuals/page.html].*
[online] [Retrieved on Jun. 29, 2010—9:14 AM] [http://reviews.cnet.com/portable speakers/lg-portable-stereo speakers/4505-11313_7-31929465.html?tag=rnav] [pp. 1-3].*
Internet Document: "Bose SoundDock Digital Music System" at http://www.bose.com/controller?event=VIEW_PRODUCT_PAGE_EVENT&product=sounddock_multimedia_index, accessed Apr. 25, 2006.

* cited by examiner

*Primary Examiner*—Ahmad F Matar
*Assistant Examiner*—Kharye Pope

(57) ABSTRACT

An audio system including an audio-enhancing station including at least one speaker and an audio-enhancing station docking connector, a music phone configured to play audio files and function as a wireless communication device separate from the audio-enhancing station, the music phone including at least one speaker to emit sound from the playing of the audio files, and a music phone docking connector that connects with the audio-enhancing station docking connector to dock the music phone with the audio-enhancing station, wherein the music phone and the audio-enhancing station together form an audio system where the at least one speaker of the music phone and the at least one speaker of the audio-enhancing station emit sound from the playing of the audio files on the music phone.

13 Claims, 2 Drawing Sheets

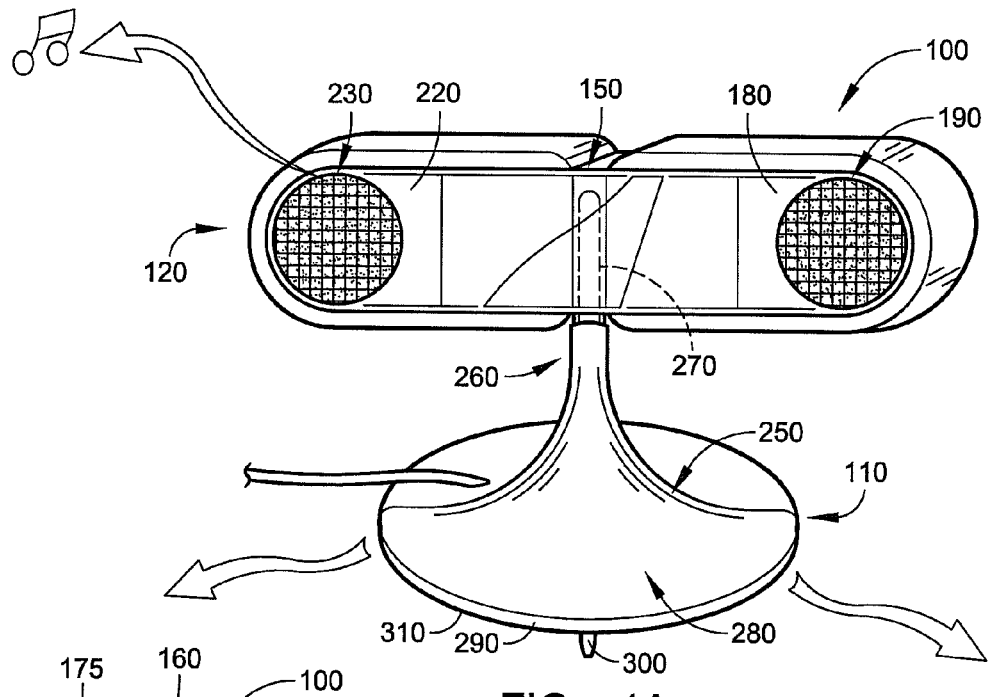
FIG. 1A
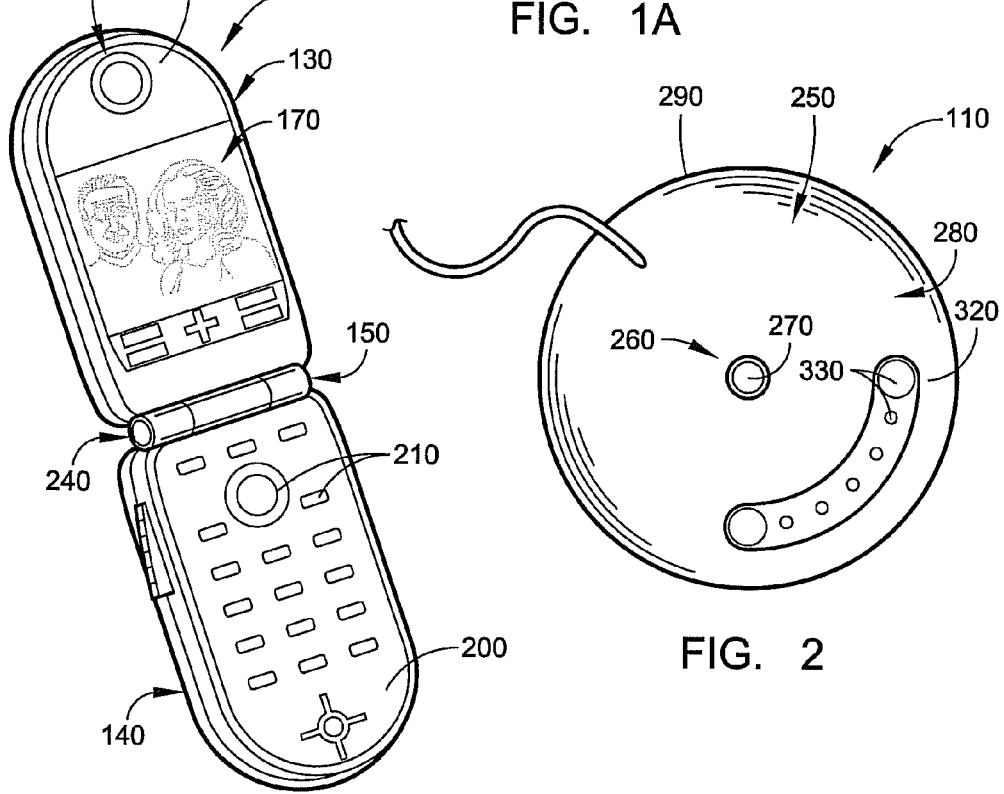
FIG. 1B
FIG. 2

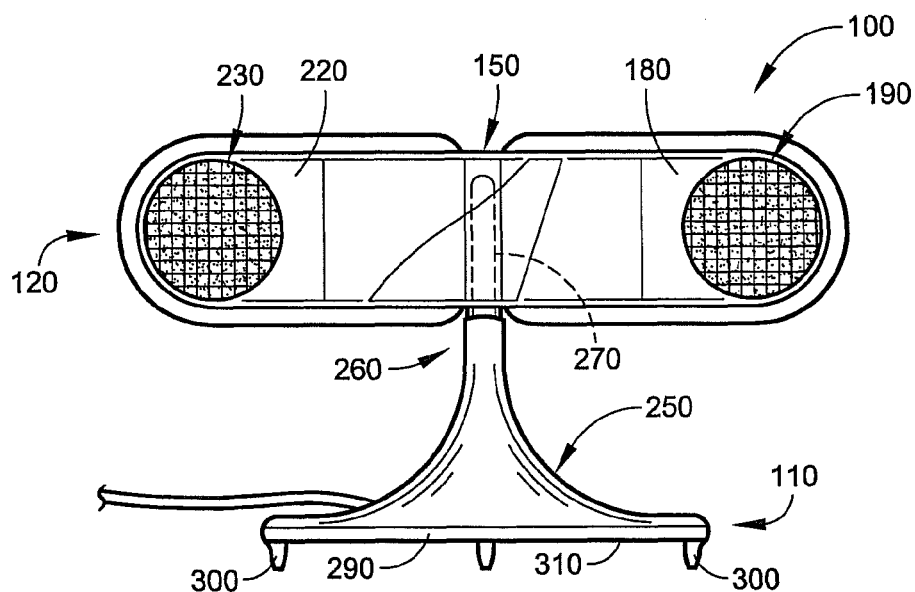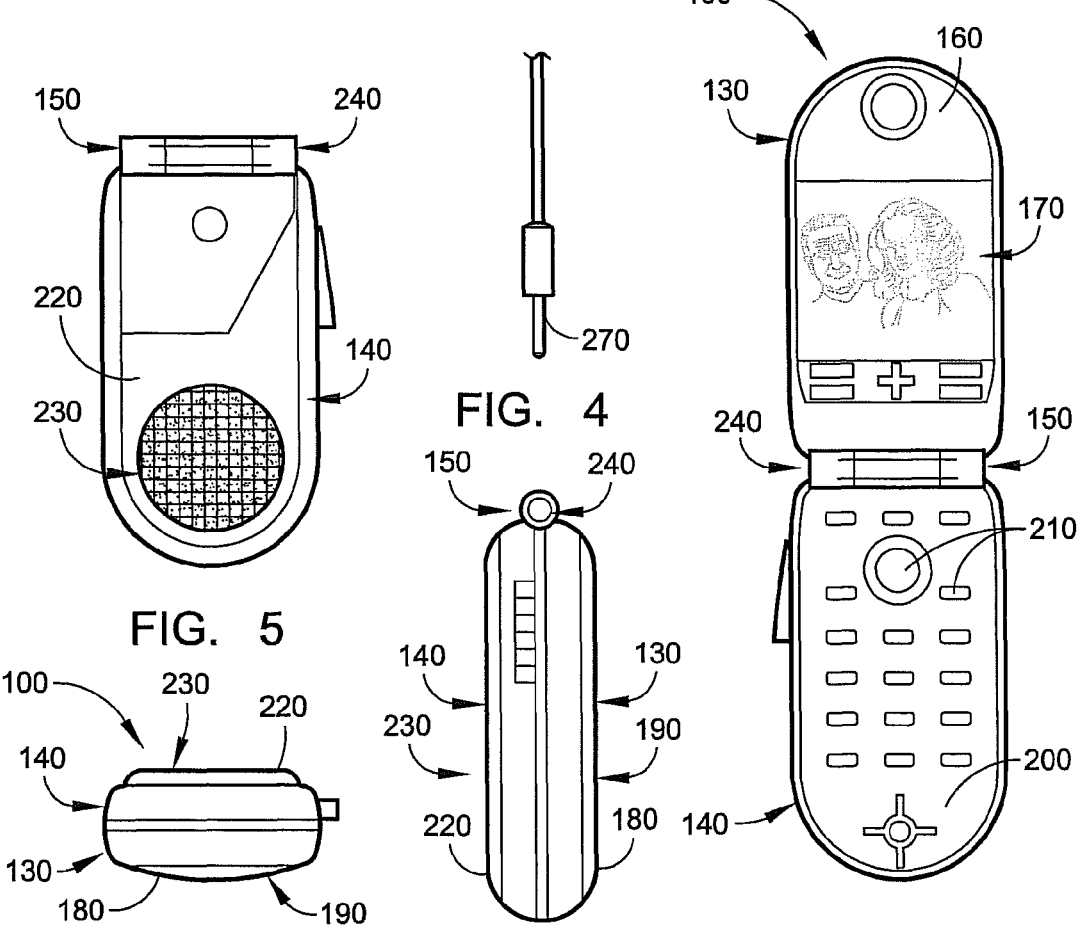

MUSIC PHONE, STATION, AND SYSTEM AND METHOD OF USING SAME

TECHNICAL FIELD

The present invention relates to handheld wireless communication devices that play music files and associated devices.

BACKGROUND

Headsets (e.g., headphones) and separate speakers have been used in the past to listen to music files played on a handheld wireless communication device. A problem with headsets is that they are designed for personal use, so they are not practical for multiple people to use at once to enjoy music played by the handheld wireless communication device. A problem with the separate speakers that have been used in the past is that they have to be purchased separately and have to be readily available for use. Unfortunately, these speakers are not readily transportable (e.g., can't be carried in one's pant pockets, don't fit easily into one's purse).

These problems and others are addressed by the music phone, audio-enhancing station, and system of the present invention.

SUMMARY

An aspect of the present invention involves a music phone and audio-enhancing station. The music phone includes a clam-shell configuration with a first housing portion and a second housing portion pivotally connected to each other at a hinge. The first housing portion includes a front with a display therein and a rear with a first external speaker therein. The second housing portion includes a front with input keys therein and a rear with a second external speaker therein. Adjacent the hinge is a combination audio and power jack. The audio enhancing station includes a substantially conical station housing. The station housing decreases in diameter progressing upward. The station housing terminates in an upper portion in a combination audio and power plug. The station housing increases in diameter progressing downward. The station housing terminates in a lower portion in a circular base. The audio-enhancing station includes at least one speaker such as, but not limited to, a sub-woofer. The station base rests upon a plurality of spacers that vertically space the bottom of the base a predetermined distance from a supporting surface (e.g., table top, desk top, shelf top, etc.). A top of the base includes at least one input key for controlling the playing of music files on the music phone.

In use, the music phone is pivoted open along the hinge and docked onto the audio-enhancing station. To dock the music phone onto the audio-enhancing station, the music phone is positioned so that the combination audio and power jack is positioned over the combination audio and power plug of the audio-enhancing station and pressed down so that the jack receives the plug. With the music phone docked and in the pivoted open position, the external speakers of the music phone are horizontally aligned and lie in the same vertical plane. The music phone is rotated about the plug so that the external speakers face in the desired direction for audio listening. The music phone and audio-enhancing station are controlled through the at least one input key on the base of the audio-enhancing station. Alternatively, or additionally, the music phone and/or audio-enhancing station are controlled via a remote control. When music files are played on the music phone, sound is emitted out of the external speakers of the music phone and out of the subwoofer of the audio-enhancing station. The sound from the subwoofer travels out of the bottom of the audio-enhancing station through the vertical space between the bottom of the base and the supporting surface. The music phone is simultaneously charged by the audio-enhancing station while docked.

Another aspect of the invention involves an audio system including an audio-enhancing station including at least one speaker and an audio-enhancing station docking connector, and a music phone configured to play audio files and function as a wireless communication device separate from the audio-enhancing station, the music phone including at least one speaker to emit sound from the playing of the audio files, and a music phone docking connector that connects with the audio-enhancing station docking connector to dock the music phone with the audio-enhancing station, wherein the music phone and the audio-enhancing station together form an audio system where the at least one speaker of the music phone and the at least one speaker of the audio-enhancing station emit sound from the playing of the audio files on the music phone.

A further aspect of the invention involves a method of playing audio files on an audio system including an audio-enhancing station having at least one speaker and an audio-enhancing station docking connector, and a music phone configured to play audio files and function as a wireless communication device separate from the audio-enhancing station, the music phone including at least one speaker to emit sound from the playing of the audio files, and a music phone docking connector that connects with the audio-enhancing station docking connector to dock the music phone with the audio-enhancing station. The method includes receiving a docking connection between the music phone and the audio-enhancing station via the music phone docking connector and the audio-enhancing station docking connector; receiving input associated with the playing of audio files on the music phone; playing audio files on the music phone so that signals corresponding to the audio files are generated; sending the generated signals to the at least one speaker of the music phone and the at least one speaker of the audio-enhancing station; and emitting sound corresponding to the signals from the at least one speaker of the music phone and the at least one speaker of the audio-enhancing station.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, in which:

FIG. 1A is a front perspective view of an embodiment of an audio system of the present invention.

FIG. 1B is a front perspective view of an embodiment of a music phone of the audio system of FIG. 1A.

FIG. 2 is a top plan view of an embodiment of the audio-enhancing station of the audio system of FIG. 1A.

FIG. 3 is a front elevational view of the audio system of FIG. 1A.

FIG. 4 is a front elevational view of an embodiment of a combination audio and power plug.

FIG. 5 is a front elevational view of the music phone of FIGS. 1A-3 shown in a closed position.

FIG. 6 is a bottom plan view of the music phone shown in FIG. 5.

FIG. 7 is a right side elevational view of the music phone shown in FIG. 5.

FIG. 8a front elevational view of the music phone of FIGS. 1A-3 and 5-7 shown in an open position.

DETAILED DESCRIPTION

Certain embodiments as disclosed herein provide for embodiments of music phone 100, audio-enhancing station 110, and audio system 120 including music phone 100 and audio-enhancing station 110, and a method of using the same.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

With reference to FIGS. 1A, 1B, and 3-8, an embodiment of music phone 100 will be described. The music phone 100 includes a clam-shell configuration with first housing portion 130 and second housing portion 140 pivotally connected to each other at hinge 150. First housing portion 130 includes front 160 with display 170 and speaker 175 therein, and rear 180 with first external speaker 190 therein. Second housing portion 140 includes front 200 with input keys 210 therein and rear 220 with second external speaker 230 therein. The speakers 190, 230 are in addition to speaker 175, which is the normal speaker for listening to another party during wireless communication with another party. In an alternative embodiment, either or both speakers 190, 230 are also used as speakerphone speakers for speakerphone listening to another party during wireless communication with another party. Adjacent hinge 150 is a combination audio and power jack 240 that functions, in part, as an audio-enhancing station docking connector. The music phone 100 includes appropriate software and hardware for carrying out the functions described herein. Although music phone 100 is shown and described as having a clam-shell configuration, in alternative embodiments, the music phone 100 includes alternative configurations such as, but not limited to, a candy bar configuration, and a configuration where first housing portion 130 and second housing portion 140 are slidable relative to each other.

With reference to FIGS. 1A, 2, and 3, an embodiment of audio enhancing station 110 includes substantially conical station housing 250. Station housing 250 decreases in diameter progressing vertically upward. Station housing 250 terminates in upper portion 260, which includes combination audio and power plug 270. The combination audio and power plug 270 functions as a music phone docking connector. Station housing 250 increases in diameter progressing downward. Station housing 250 terminates in lower portion 280 in circular base 290. Audio-enhancing station 110 includes at least one speaker such as, but not limited to, a sub-woofer. The station base 290 rests upon a plurality of spacers 300 that vertically space a bottom 310 of the base a predetermined distance from a supporting surface (e.g., table top, desk top, shelf top, etc.). The audio enhancing station 110 includes appropriate software and hardware for carrying out the functions described herein.

With reference to FIG. 2, in an alternative embodiment of the invention, top 320 of base 290 includes at least one input key 330 for controlling the playing of music files on music phone 100.

To play music files with the audio system 120, the audio system 120 is assembled to play music by the music phone 100 being pivoted open along hinge 150 and receiving a docking connection with audio-enhancing station 110. A docking connection occurs by the music phone 100 being positioned so that combination audio and power jack 240 is over combination audio and power plug 270 of audio-enhancing station 110 and being pressed down so that jack 240 receives plug 270. With music phone 100 docked and in the pivoted-open position, external speakers 190, 230 of music phone 100 become horizontally aligned by the user so that external speakers 190, 230 lie in the same vertical plane. Music phone 100 becomes rotated clockwise or counterclockwise about plug 240 so that external speakers 190, 230 face in the desired direction for listening to the audio system 120 by a user.

In an embodiment of the invention, the playing of music files is controlled by the music phone 100 being rotated clockwise or counterclockwise about plug 240 so that input keys 210 of music phone 100 face the user. Input keys 210 receive input from the user for control of music file play on music phone 100.

Alternatively, in the embodiment of system 120 shown in FIG. 2, where top 320 of base 290 includes at least one input key 330 for controlling the playing of music files on music phone 100, at least one input key 300 on base 290 of audio-enhancing station 110 receives input from the user for control of music file play on music phone 100.

In a further embodiment of system 120, system 120 additionally includes a wireless remote control for music phone 100 and/or audio-enhancing station 110 wirelessly being controlled for music file play on music phone 100.

The audio-enhancing station 110 includes its own power source (e.g., at least one battery, at least one rechargeable battery) and/or receives power via a power cord and plug (not shown) plugged into an AC power source.

When music files stored in memory are played using appropriate software on music phone 100, appropriate signals are sent to and driven by external speakers 190, 230 and sound is emitted out of external speakers 190, 230. Signals are also sent to and driven by audio-enhancing station 110 via audio and power jack 240 and combination audio and power plug 27. The subwoofer in audio-enhancing station 110 receives the signals from the music phone 100 and emits sound that travels out of the bottom of audio-enhancing station 110, through the vertical space between bottom 310 of base 290 and the supporting surface (e.g., table top).

Audio files played by the music phone include low frequency signals and high frequency signals. In another embodiment, when music phone 100 is docked with audio-enhancing station 110, high frequency signals are sent to and driven by speakers 190, 230 of music phone 100 and low frequency signals are sent to and driven by subwoofer of audio-enhancing station 110. When music phone 100 is not docked with audio-enhancing station 110, high frequency signals and low frequency signals are sent to and driven by speakers 190, 230 of music phone 100. Music phone 100 and/or audio-enhancing station 110 includes crossover (or other similar (e.g., signal splitting or filtering)) functionality and circuitry to separate out the signals. In a further implementation, music phone 100 and/or audio-enhancing station 110 are configured to allow toggling of the selection of these features. In a still further implementation, music phone 100 and/or audio-enhancing station 110 are configured to allow the user to specify the crossover frequency. In another implementation, music phone 100 and/or audio-enhancing station 110 are configured to automatically select crossover frequency based on the station docked to (e.g., based on woofer speaker size).

At least one power source (e.g., at least one rechargeable battery) of music phone 100 is charged by audio-enhancing station 110 while music phone 100 is docked with audio-enhancing station 110. Power is transmitted from the power source(s) of the audio-enhancing station 110 and received by the music phone 100 via audio and power jack 240 and combination audio and power plug 27 for recharging at least one power source of the music phone 100.

Thus, with the music phone 100 docked to audio-enhancing station 110, audio system 120 is formed. The audio-enhancing station 110 enhances the audio output of music phone 100 and simultaneously charges at least one power source of the music phone 100.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An audio system, comprising:
   an audio-enhancing station including at least one speaker and an audio-enhancing station docking connector,
   a music phone configured to play audio files and function as a wireless communication device separate from the audio-enhancing station, the music phone including a music phone docking connector that connects with the audio-enhancing station docking connector to dock the music phone with the audio-enhancing station, a clam-shell configuration with a first housing portion, a second housing portion, and a hinge pivotally connecting the first housing portion and the second housing portion together, a front and a rear, the front of the first housing portion including a display, the front of the second housing portion including input keys to operate the music phone, the rear of the first housing portion including a first external speaker, the rear of the second housing portion including a second external speaker, the first and second external speakers emitting sound resulting from the playing of the audio files,
   wherein the music phone and the audio-enhancing station together form an audio system where the first and second external speakers of the music phone and the at least one speaker of the audio-enhancing station emit sound from the playing of the audio files on the music phone, and
   the audio-enhancing station docking connector is a vertically extending combination audio and power plug that transmits electrical signals representative of the audio files played on the music phone to the at least one speaker of the audio-enhancing station, and transmits power to the music phone to recharge at least one power source of the music phone,
   the hinge includes the music phone docking connector,
   the music phone docking connector hinge matingly receives the vertically extending combination audio and power plug so as to support the music phone in an open position and form an audio system with the music phone docked to the audio-enhancing station.

2. The audio system of claim 1, wherein the audio-enhancing station includes at least one input key to control the playing of music files on the music phone.

3. The audio system of claim 1, wherein the at least one speaker of the audio-enhancing station includes at least one subwoofer speaker.

4. The audio system of claim 1, wherein the audio-enhancing station has a substantially conical external configuration.

5. The audio system of claim 1, wherein the audio-enhancing station includes a bottom and a plurality of spacers that vertically space the bottom a predetermined distance from a supporting surface, and sound emitted from the at least one speaker of the audio-enhancing station is emitted out of the audio-enhancing station through the vertical space between the bottom and the supporting surface.

6. The audio system of claim 1, wherein the music phone includes at least one input key to control the playing of music files on the music phone.

7. The audio system of claim 1, wherein the music phone docking connector is a combination audio and power jack that transmits electrical signals representative of the audio files played on the music phone to the at least one speaker of the audio-enhancing station, and transmits power to the music phone to recharge at least one power source of the music phone.

8. The audio system of claim 1, wherein audio files played by the music phone include low frequency signals and high frequency signals, and wherein when the music phone is docked with the audio-enhancing station the high frequency signals are sent to and driven by the first and second external speakers of the music phone and the low frequency signals are sent to and driven by the at least one speaker of the audio-enhancing station, and when the music phone is not docked with the audio-enhancing station the high frequency signals and the low frequency signals are sent to and driven by the first and second external speakers of the music phone.

9. A method of playing audio files on an audio system including an audio-enhancing station having at least one speaker and an audio-enhancing station docking connector, and a music phone configured to play audio files and function as a wireless communication device separate from the audio-enhancing station, the music phone including a music phone docking connector that connects with the audio-enhancing station docking connector to dock the music phone with the audio-enhancing station, a clam-shell configuration with a first housing portion, a second housing portion, and a hinge pivotally connecting the first housing portion and the second housing portion together, a front and a rear, the front of the first housing portion including a display, the front of the second housing portion including input keys to operate the music phone, the rear of the first housing portion including a first external speaker, the rear of the second housing portion including a second external speaker, the first and second external speakers emitting sound resulting from the playing of the audio files, the audio-enhancing station docking connector is a vertically extending combination audio and power plug that transmits electrical signals representative of the audio files played on the music phone to the at least one speaker of the audio-enhancing station, and transmits power to the music phone to recharge at least one power source of the music phone, the hinge includes the music phone docking connector, the music phone docking connector hinge matingly receives the vertically extending combination audio and power plug so as to support the music phone in an open position and form an audio system with the music phone docked to the audio-enhancing station, comprising:

receiving a docking connection between the music phone and the audio-enhancing station via the music phone docking connector and the audio-enhancing station docking connector whereby the music phone docking connector hinge matingly receives the vertically extending combination audio and power plug so as to support the music phone in an open position;

receiving input associated with the playing of audio files on the music phone;

playing audio files on the music phone so that signals corresponding to the audio files are generated;

sending the generated signals to the first and second external speakers of the music phone and the at least one speaker of the audio-enhancing station;

emitting sound corresponding to the signals from the first and second external speakers of the music phone and the at least one speaker of the audio-enhancing station.

10. The method of claim 9, wherein the audio-enhancing station includes at least one input key to control the playing of music files on the music phone, and receiving input includes receiving input from the at least one input key for control of the playing of audio files on the music phone.

11. The method of claim 9, wherein the at least one speaker of the audio-enhancing station includes at least one subwoofer speaker, and emitting sound includes emitting sound with the at least one subwoofer speaker.

12. The method of claim 9, wherein the audio-enhancing station includes a bottom and a plurality of spacers that vertically space the bottom a predetermined distance from a supporting surface, and emitting sound includes emitting sound from the at least one speaker of the audio-enhancing station out of the audio-enhancing station through the vertical space between the bottom and the supporting surface.

13. The method of claim 9, wherein audio files played by the music phone generate low frequency signals and high frequency signals, and wherein when receiving a docking connection between the music phone and the audio-enhancing station, the high frequency signals are sent to and driven by the first and second external speakers of the music phone and the low frequency signals are sent to and driven by the at least one speaker of the audio-enhancing station, and when not docked, the high frequency signals and the low frequency signals are sent to and driven by the first and second external speakers of the music phone.

* * * * *